(12) United States Patent
Ushio

(10) Patent No.: US 7,379,222 B2
(45) Date of Patent: May 27, 2008

(54) OPTICAL SCANNING UNIT AND IMAGE FORMING APPARATUS

(75) Inventor: Kenji Ushio, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 11/272,724

(22) Filed: Nov. 15, 2005

(65) Prior Publication Data

US 2006/0126148 A1    Jun. 15, 2006

(30) Foreign Application Priority Data

Dec. 13, 2004  (JP) ............................. 2004-360269

(51) Int. Cl.
  *G02B 26/08*  (2006.01)
(52) U.S. Cl. ..................... 359/212; 359/216; 359/872
(58) Field of Classification Search ..................... None
  See application file for complete search history.

(56) References Cited

U.S. PATENT DOCUMENTS 7,048,394 B2 *  5/2006  Takase et al. ............... 359/872

FOREIGN PATENT DOCUMENTS

| JP | 11-352427 | 12/1999 |
|----|-----------|---------|
| JP | 2000-180748 | 6/2000 |
| JP | 2002-277785 | 9/2002 |

* cited by examiner

*Primary Examiner*—James Phan
(74) *Attorney, Agent, or Firm*—Fitzpatrick, Cella, Harper & Scinto

(57) ABSTRACT

An optical apparatus for irradiating a surface to be scanned with laser light comprises rotary deflecting means for deflecting laser light emitted by a laser emitting means in a shape of a plane, a mirror for reflecting the laser light, an enclosure for housing the mirror, a first mirror supporting part capable of moving in a direction parallel to the laser light irradiated toward the mirror and supporting the mirror; and a second mirror supporting part capable of supporting the mirror in such a way that the mirror can rotate around an axis where the laser light is in close agreement with a scanning line with which the mirror is scanned.

8 Claims, 13 Drawing Sheets

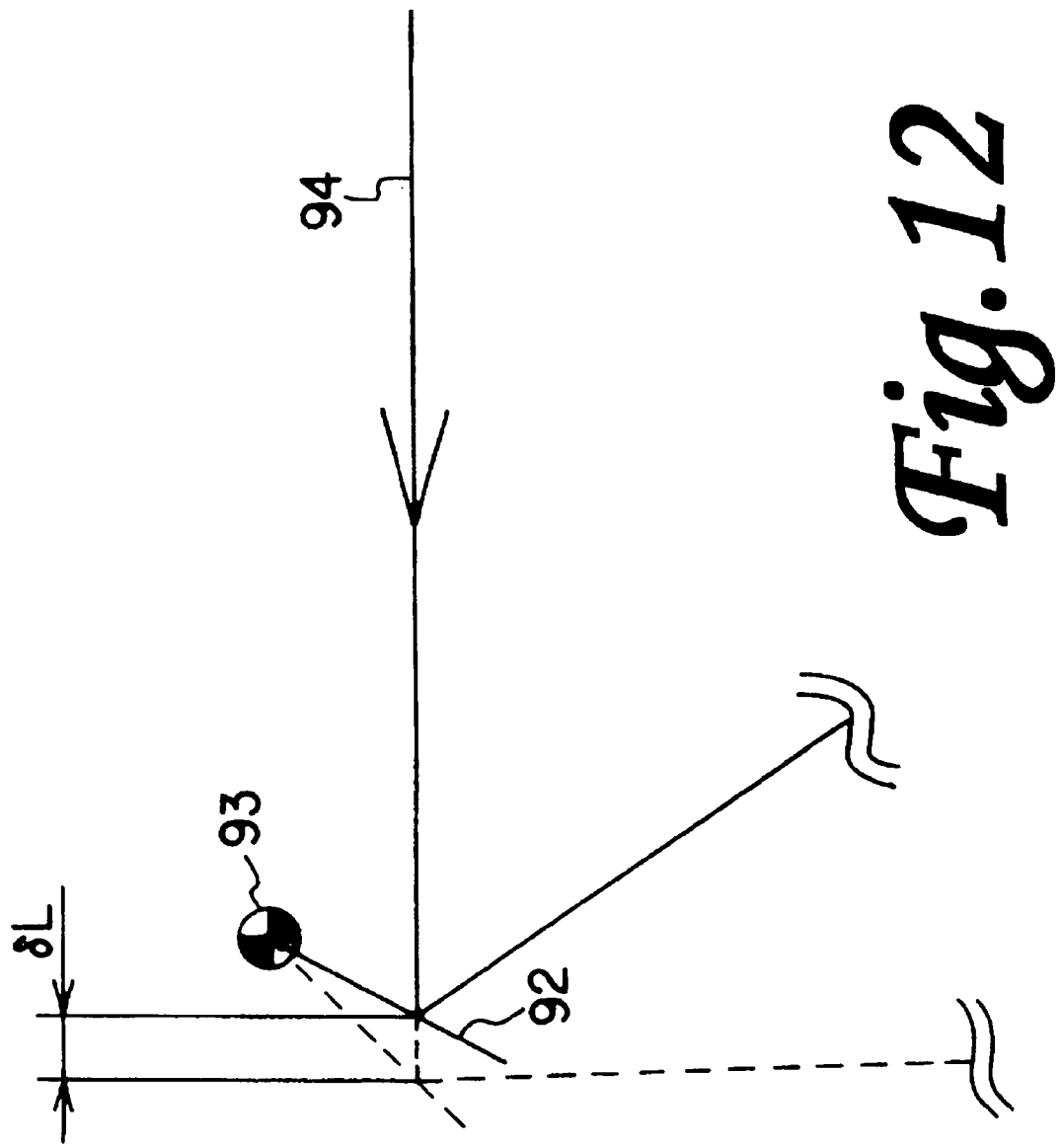

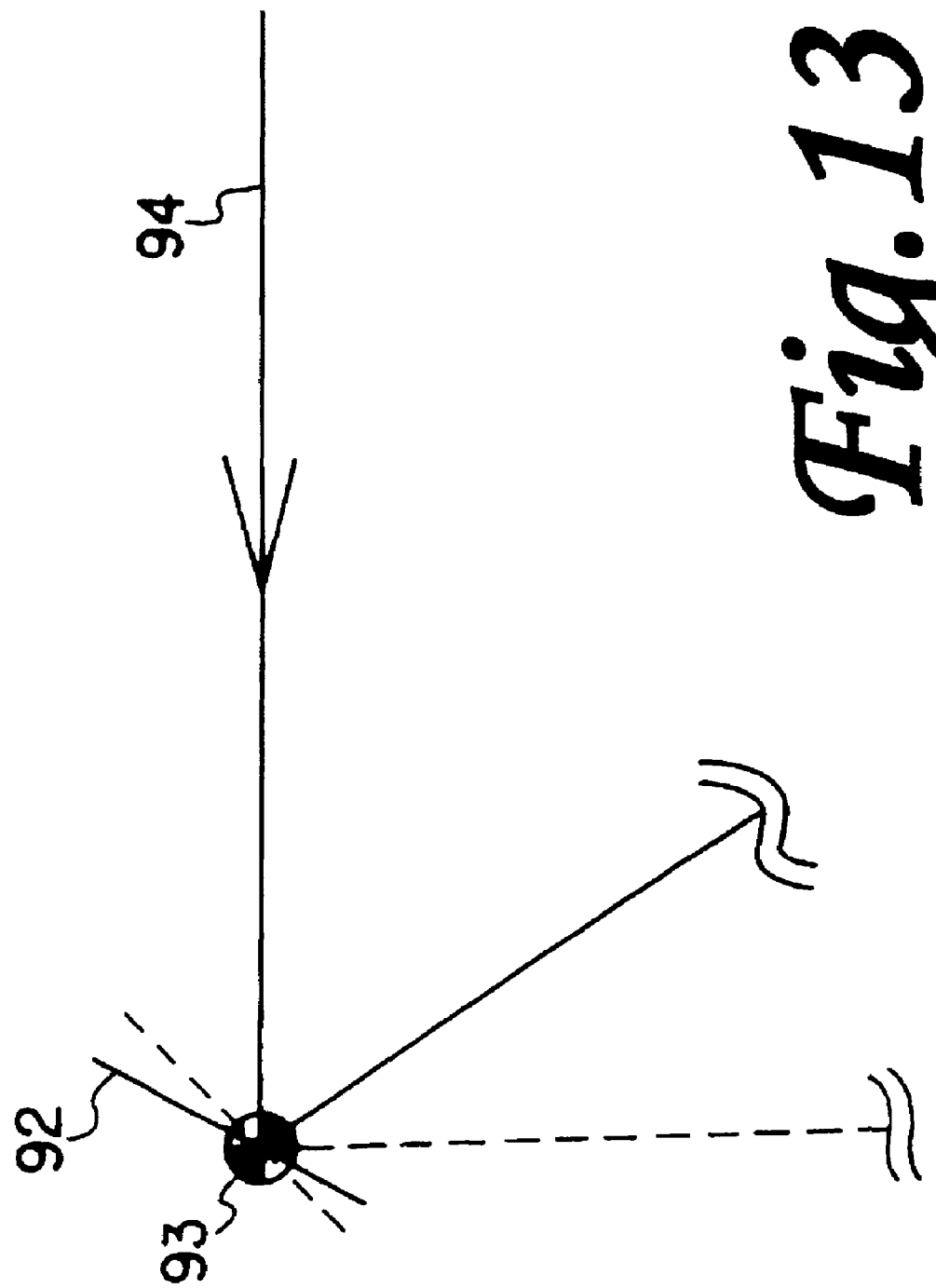

OPTICAL SCANNING UNIT AND IMAGE FORMING APPARATUS

BACKGROUND OF THE INVENTION

1. Field of the Invention

The present invention relates to an optical scanning unit used for an image forming apparatus such as a copying machine and a printer of an electrophotographic type, and an image forming apparatus provided with the same.

2. Description of the Related Art

In a laser scanning unit used for an image forming apparatus of an electrophotographic type, laser light emitted from a semiconductor laser is deflected by a rotary polygon mirror and a photosensitive member (surface to be scanned) is scanned with the laser light, whereby an electrostatic latent image is formed on the surface of the photosensitive member.

In most of such laser scanning units, an optical path is bent by a mirror for reflecting laser light to reduce the size of the unit.

In the above-mentioned laser scanning unit, some deviations are caused by the faulty dimensional accuracy and faulty mounting accuracy of constituent components. Among them, typical deviations are a deviation in parallelism between the generating line of the photosensitive member and the main scanning line of the laser light (inclination of main scanning), a deviation in magnification in the direction of main scanning (magnification of main scanning), a deviation in the irradiation position in the direction of sub-scanning (irradiation position of sub-scanning), and the like.

Conventionally, these deviations are corrected by adjusting the mounting angle and position of a reflecting mirror for reflecting the optical path of laser light.

FIG. 7 shows a mirror construction of the above-mentioned conventional type and a construction for supporting a reflecting mirror of the type and a method for adjusting the mirror will be described below.

A rotary polygon mirror 101 shown in FIG. 7 deflects laser light. The deflected laser light is reflected by a deflecting mirror 102 toward a photosensitive drum 103. Three set screws 106a, 106b, 106c are mounted in a protruding manner on supporting metal plates 104, 105 mounted on a base member (not shown) and the reflecting surface of the reflecting mirror 102 is supported by the tips of the three protruded set screws 106a, 106b, 106c.

The set screws 106a, 106b support two points in a portion close to one end of the reflecting mirror 102 and the set screw 106c supports one point in a portion close to another end of the reflecting mirror 102. There is provided a construction in which a plane including a triangle formed by the tips of the three set screws 106a, 106b, 106c agrees with the surface of the mirror (reflecting surface) and in which the plane formed by the triangle (=surface of the mirror) can be freely inclined or shifted by screwing or unscrewing the respective set screws or by changing the amount of protrusion of them (refer to FIG. 8 and FIG. 9).

The irradiation position of sub-scanning is adjusted by adjusting the amount of protrusion of the set screw 106a or 106b to incline the reflecting mirror 102 in an A direction. The inclination of main scanning is adjusted by adjusting the amount of protrusion of the set screw 106c or the two set screws 106a, 106b to rotate the reflecting mirror 102 in a B direction. The magnification of main scanning is adjusted by changing the amount of protrusion of the three set screw 106a, 106b, and 106c by the same amount to shift the reflecting mirror 102 in a C direction. The adjustment is made as follows: first, the inclination of main scanning is adjusted; then, the magnification of main scanning is adjusted; and finally, the irradiation position of sub-scanning is adjusted.

Moreover, in addition to the above-mentioned conventional adjustment method, Japanese Unexamined Patent Publication No. 2002-277785 discloses an optical scanning unit that includes a mechanism for supporting the reflecting surface of a mirror at two supporting points and capable of swinging the reflecting surface of the mirror around the two supporting points and has a swinging axis connecting the two supporting points set in such a way as to be in close agreement with the path of scanning light moving on the mirror.

Meanwhile, Japanese Unexamined Patent Publication No. Hei 11-352427 discloses a construction in which supporting members provided on both ends of the reflecting mirror can move together.

Moreover, Japanese Unexamined Patent Publication No. 2000-180748 and No. 2002-277785 discloses a construction in which the reflecting surface is made to agree with the rotational center of the mirror.

However, according to the above-mentioned adjusting methods, when the amount of protrusion of the set screw 106a is changed so as to adjust the irradiation position, the surface of the reflecting mirror is rotated around an imaginary straight line passing the tips of the other two set screws 106b, 106c and hence the inclination and magnification of main scanning are deviated at the same time. Then, the inclination and magnification of main scanning are readjusted, which in turn deviates also the irradiation position of sub-scanning. Therefore, these three adjustments need to be repeated several times to converge the respective adjustment items on specifications. This presents the problem of increasing the number of man-hours required for adjustment work.

Moreover, according to the construction disclosed in Japanese Unexamined Patent Publication No. 2002-277785, by causing the rotational axis of the mirror to agree with the scanning line of laser in the longitudinal direction of the mirror so as to adjust the irradiation position of sub-scanning, it is possible to prevent an optical path length from being deviated by the rotation of the mirror. However, according to the construction disclosed in Japanese Unexamined Patent Publication No. 2002-277785, the mirror cannot be moved in the direction of irradiation of laser and hence the direction of main scanning cannot be adjusted.

SUMMARY OF THE INVENTION

The object of the present invention is to provide an optical apparatus in which even when a mirror is moved so as to adjust the direction of main scanning, the rotational axis of the mirror agrees with the laser scanning line in the longitudinal direction of the mirror.

Another object of the present invention will be made clear by the following description.

According to another object of the present invention, there is provided an optical apparatus for irradiating a surface to be scanned with laser light, comprises rotary deflecting means for deflecting laser light emitted by a laser emitting means in a shape of a plane; a mirror for reflecting the laser light: an enclosure for housing the mirror; a first mirror supporting part capable of moving in a direction parallel to the laser light irradiated toward the mirror and supporting the mirror; and a second mirror supporting part capable of supporting the mirror in such a way that the mirror can rotate around an axis where the laser light is in close agreement with a scanning line with which the mirror is scanned.

BRIEF DESCRIPTION OF THE DRAWINGS

FIG. 12 is a diagram showing a system in which the rotational center of a mirror deviates from an optical axis; and FIG. 13 is a diagram showing a system in which the rotational center of a mirror agrees with an optical axis.

DETAILED DESCRIPTION OF THE PREFERRED EMBODIMENTS

The best mode for carrying out this invention will be hereinafter described in detail by way of example with reference to the drawings. However, it is not intended to limit the scope of this invention only to the size, materials, shapes, and relative positions of constituent components described in this embodiment, unless otherwise specified. Moreover, the materials and shapes of members described once in the following description are the same as those in the first description, unless otherwise specified.

Figure 10:
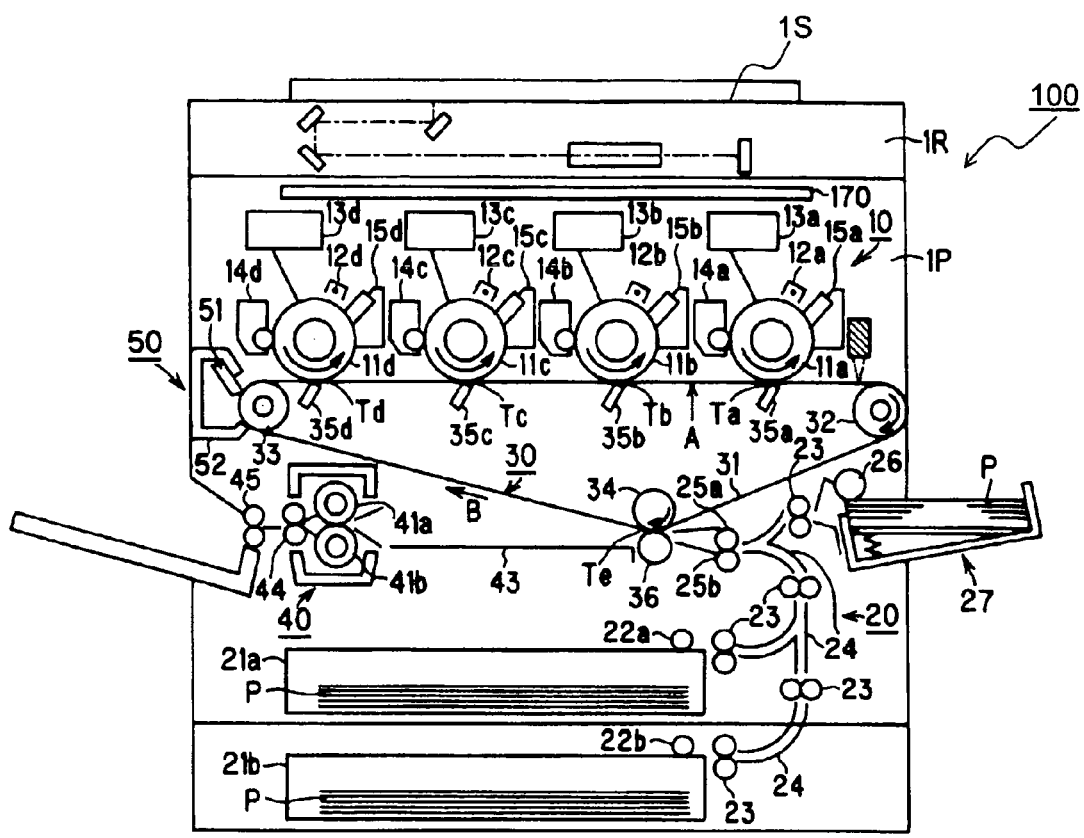
FIG. 10 is a sectional view of an image forming apparatus according to the embodiment of the present invention.

General Construction of Image Forming Apparatus Provided with Optical Scanning Unit FIG. 10 is a color image forming apparatus of an electrophotographic type provided with laser scanning units 13a to 13d as optical scanning units according to one embodiment of the present invention. Hereinafter, construction and operation will be described.

In an image forming apparatus 100 shown in FIG. 10, an image reading section 1R reads image data from an original placed on a document tray 1S. An image outputting section 1P forms an image on a recording medium (transfer sheet P) on the basis of image data inputted from the image reading section 1R or an external unit or a network via an external interface (not shown).

The image outputting section 1P is mainly constructed of: an image forming unit 10 (having four stations a, b, c, and d, which are juxtaposed with each other and are constructed nearly in the same manner); a sheet feeding unit 20; a intermediate transfer unit 30; a fixing unit 40; and a control unit (not shown and including a control substrate 170, a motor driving substrate (not shown), an external interface (not shown), and the like).

The individual sections and units will be described in more detail.

The image forming unit 10 is constructed in a manner to be described below. A photosensitive drums 11 (11a, 11b, 11c, 11d) as image bearing members are axially supported at the center and rotated in a direction shown by arrows. Primary chargers 12 (12a, 12b, 12c, 12d), laser scanning units 13 (13a, 13b, 13c, 13d) as optical scanning units, and developing units 14 (14a, 14b, 14c, 14d) are arranged opposite to the outer peripheral surfaces of the photosensitive drums 11 in the direction in which the photosensitive drums 11 are rotated. The laser scanning units 13 are positioned by positioning pins (not shown) provided on a frame of main body and are fixed by screws (not shown). The primary chargers 12 provide the surfaces of the photosensitive drum 11 with charges of a uniform quantity of charge.

Next, the laser scanning units 13 expose the surfaces of the photosensitive drums 11 to laser light modulated according to recording image signals, respectively, to form electrostatic latent images. The developing units 14, which receive developing agents (toners) of four colors of yellow (Y), magenta (M), cyan (C), and black (BK), respectively, develop the above-mentioned electrostatic latent images to form visible images.

Next, visible images formed on the photosensitive drums 11 are transferred to a intermediate transfer belt 31 as a intermediate transfer member. On the downstream sides in the rotational direction of the respective photosensitive drums 11 from respective image transfer regions Ta, Tb, Tc, and Td, the toners which are not transferred to the transfer sheet P but left on the respective photosensitive drums 11 are scraped by respective cleaning units 15 (15a, 15b, 15c, 15d) to clean the surfaces of the respective photosensitive drums 11.

By the above-mentioned process, images are formed in succession by the respective toners of yellow (Y), magenta (M), cyan (C), and black (BK).

The sheet feeding unit 20 is constructed of: cassettes 21a, 21b, and a manual feed tray 27 for receiving the transfer sheets P; pickup rollers 22a, 22b, 26 for feeding the transfer sheets P one by one from the cassettes 21a, 21b or the manual feed tray 27; pairs of sheet feeding rollers 23, and sheet feeding guides 24 for conveying the transfer sheets P fed by the respective pickup rollers 22a, 22b, 26 to a registration roller; and pairs of registration rollers 25a, 25b for feeding the transfer sheets P to a secondary transfer region Te in accordance with the image forming timing of the image forming unit.

Next, the intermediate transfer unit 30 will be described. The intermediate transfer belt 31 is looped around a driving roller 32 for transmitting a driving force to the intermediate transfer belt 31, a tension roller 33 for applying an appropriate amount of tension to the intermediate transfer belt 31 by a force applied by a spring (not shown), and a driven roller 34 opposed to the secondary transfer region Te across the intermediate transfer belt 31. A primary transfer plane A is formed between the driving roller 32 and the tension roller 33 of these rollers. In the driving roller 32, the surface of a metal roller is coated with rubber (urethane or chloroprene) in a thickness of several millimeters, thereby being prevented from slipping on the intermediate transfer belt 31. The driving roller 32 is driven and rotated by a pulse motor (not shown). In the respective primary transfer regions Ta to Td in which the respective photosensitive drums 11 and the intermediate transfer belt 31 are opposed to each other, primary transfer blades 35 (35a, 35b, 35c, 35d) are arranged on the back of the intermediate transfer belt 31. Moreover, a secondary transfer roller 36 is arranged opposite to the driven roller 34 to form the secondary transfer region Te by a nip formed by itself and the intermediate transfer belt 31.

The secondary transfer roller 36 is pressed onto the intermediate transfer belt 31 by an appropriate amount of pressure. Moreover, a cleaning unit 50 for cleaning the image forming surface of the intermediate transfer belt 31 is arranged on the intermediate transfer belt 31 and on the downstream side in the direction of rotation of the intermediate transfer belt 31 of the secondary transfer region Te.

The cleaning unit 50 is constructed of a cleaning blade 51 (made of polyurethane rubber or the like) and waste toner box 52 for receiving waste toner.

The fixing unit 40 is constructed of: a fixing roller 41a provided with a heat source having a halogen heater or the like mounted therein and a fixing roller 41b pressed by the fixing roller 41a (there is a case where the fixing roller 41b is also provided with a heat source); a guide 43 for guiding the transfer sheet P to the nip formed by the above-mentioned pair of rollers; inside sheet discharging rollers 44 for guiding out the transfer sheet P discharged from the above-mentioned pair of rollers to the outside of the apparatus; outside sheet discharging rollers 45; and the like.

The control unit is constructed of a control substrate 170 for controlling the operations of mechanisms in the above-mentioned respective units, a motor driving substrate (not shown), and the like.

General Description of Image Forming Operation

When an image forming operation starting signal is outputted, first, the transfer sheets P is fed one by one from the cassette 21a by the pickup roller 22a. Then, the transfer sheet P is guided between the sheet feeding guides 24 by the pair of sheet feeding rollers 23, thereby being conveyed to the pair of registration rollers 25a, 25b.

At this time, the pair of registration rollers 25a, 25b are stopped and hence the top of the transfer sheet P abuts against the nip portion. Thereafter, the pair of registration rollers 25a, 25b start rotating in accordance with the timing when the image forming unit 10 starts forming an image. The timing when the pair of registration rollers 25a, 25b start rotating is set in such a way that the transfer sheet P just agrees with a toner image primarily transferred to the intermediate transfer belt 31 by the image forming unit 10 at the secondary transfer region Te.

Meanwhile, in the image forming unit 10, when the image forming operation starting signal is outputted, a toner image formed on the photosensitive drum 11d on the uppermost upstream side in the direction of rotation of the intermediate transfer belt 31 by the above-mentioned process is primarily transferred to the intermediate transfer belt 31 in the primary transfer region Td by the primary transfer blade (primary transfer charger) 35d having a high voltage applied thereto.

The primarily transferred toner image is conveyed to the next primary transfer region Tc. In the next primary transfer region Tc where an image is formed by delaying the time required to convey the toner image between the respective image forming units, a next toner image is transferred to the preceding image formed at the preceding transfer region in accordance with the timing. Thereafter, the same processes are repeatedly carried out. In this manner, finally, the toner images of four colors are primarily transferred to the intermediate transfer belt 31.

Thereafter, when the transfer sheet P is entered into the secondary transfer region Te and is brought into contact with the intermediate transfer belt 31, a high voltage is applied to the secondary transfer roller 36 in accordance with the timing when the transfer sheet P passes. Then, the toner images of four colors formed on the intermediate transfer belt 31 by the above-mentioned process are transferred to the surface of the transfer sheet P.

Thereafter, the transfer sheet P is correctly guided into a nip formed by the fixing rollers 41a, 41b by the conveyance guide 43. Then, the toner images are fixed to the surface of the transfer sheet P by the heat and pressure at the nip of the pair of fixing rollers 41a, 41b. Thereafter, the transfer sheet P is conveyed by the inside sheet discharging rollers 44 and the outside sheet discharging rollers 45, thereby being discharged to the outside of the image forming apparatus.

Moreover, when an image of a single color is obtained, a visible image of a single color is primarily transferred to the intermediate transfer belt 31 by a specific image forming unit (for example, an image forming unit arranged on the downmost downstream side in the direction in which the intermediate transfer belt 31 travels) and then is subjected to the same process as in the case where the image of full color is formed, whereby the image of a single color is obtained.

Optical Scanning Unit

Figure 1:
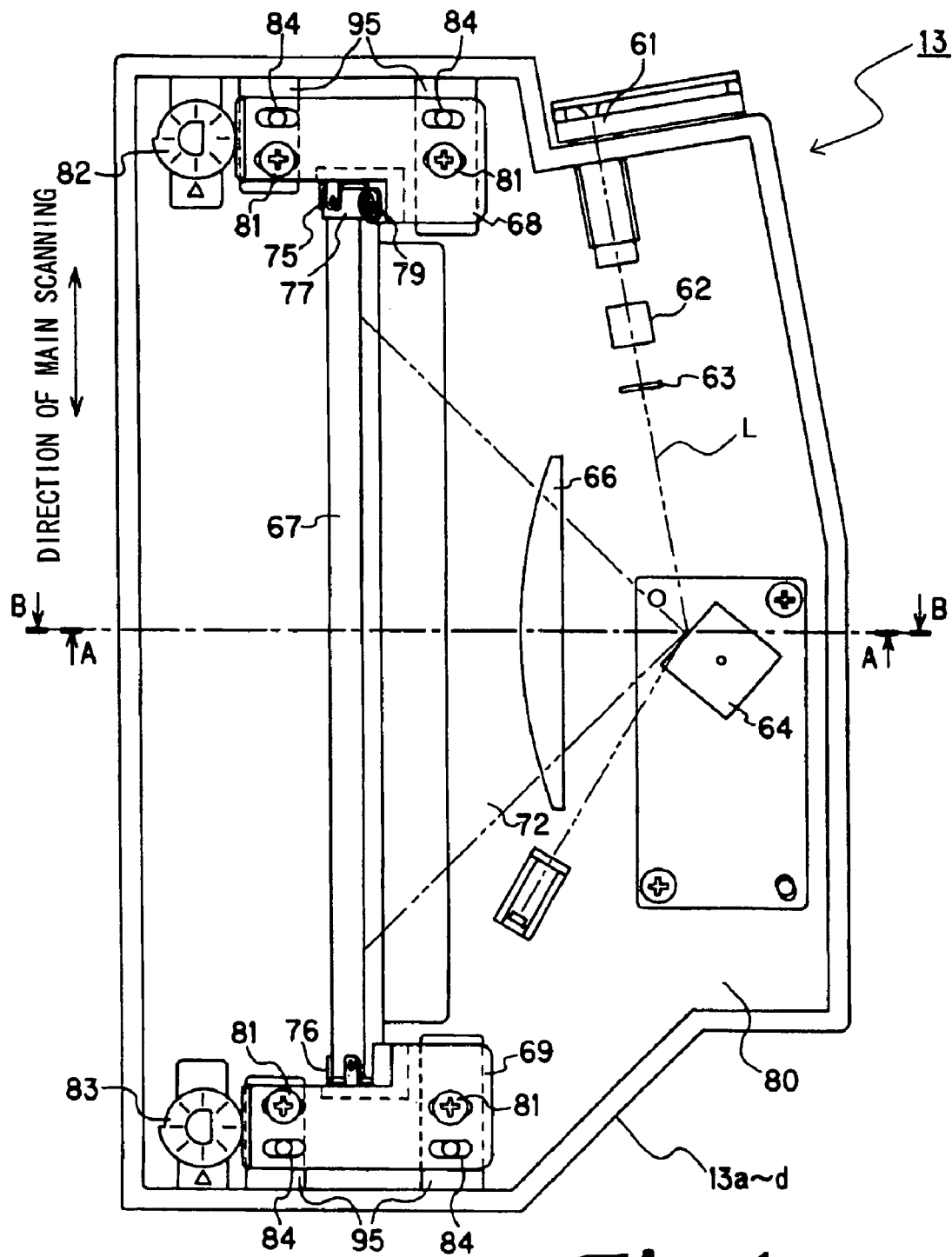
FIG. 1 is a view when viewed from above of a laser scanning apparatus according to the present invention.
Figure 2:
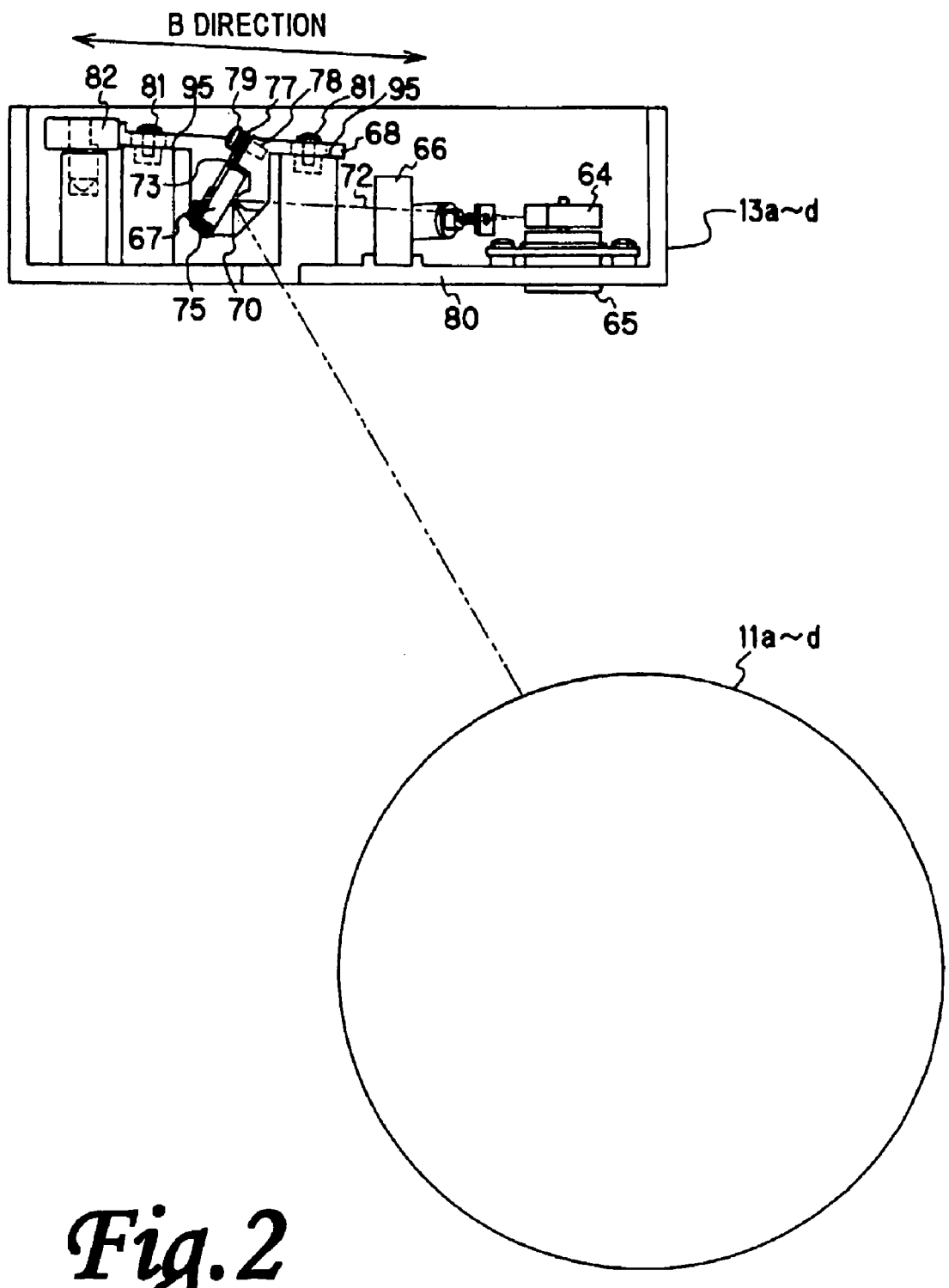
FIG. 2 is a sectional view taken on a line A-A in FIG. 1.
Figure 3:
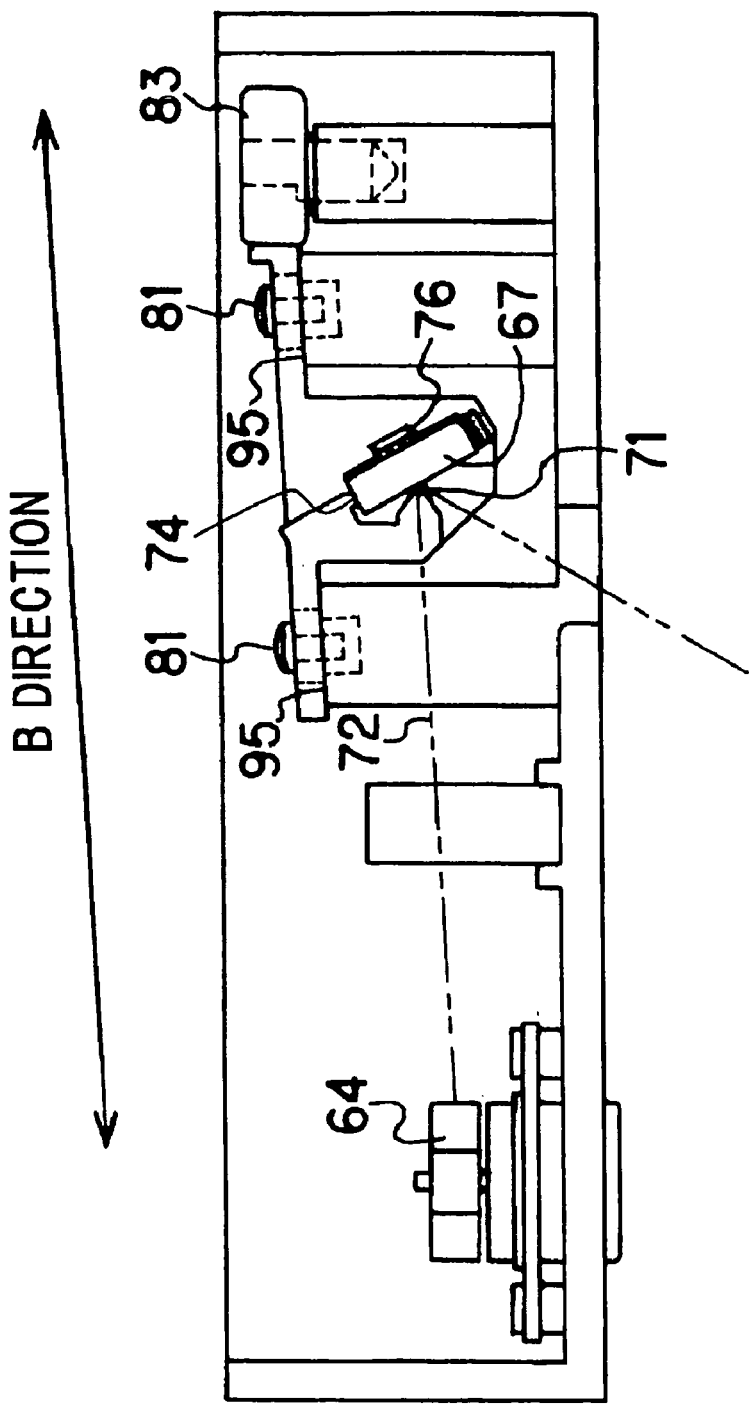
FIG. 3 is a sectional view taken on a line B-B in FIG. 1.

Next, a laser scanning unit as an optical scanning unit of one embodiment of the present invention will be described with reference to FIG. 1 to FIG. 3. FIG. 1 is a view, when viewed from above, of a laser scanning unit according to the present invention. FIG. 2 is a sectional view taken on a line A-A in FIG. 1 and FIG. 3 is a sectional view taken on a line B-B in FIG. 1.

Construction of Laser Scanning Unit

A laser scanning unit 13 as an optical scanning unit emits laser light L from a semiconductor laser 61 as laser light emitting means. The emitted laser light L passes through a collimator lens 62 and a slit 63 and is incident on rotary deflecting means for deflecting the laser light L in the shape of a plane. In the present embodiment, a rotary polygon mirror 64 of a rotary polygonal mirror is used as the rotary deflecting means. The rotary polygon mirror 64 is rotated at a high speed by the polygon motor 65 to deflect the incident laser light L in the direction of main scanning of the photosensitive drum 11. The deflected laser light L passes through an fθ lens 66 and then is reflected by a reflecting mirror 67, thereby having its direction bent, and the surface of the photosensitive drum 11 (which is to be scanned) is scanned in a specified direction with the deflected laser light L.

Construction of Supporting Reflecting Mirror

The reflecting mirror 67 is housed in a scanner case 80 as an enclosure and is supported by a first mirror supporting part with respect to the scanner case 80, that is, has its both ends supported by first and second mirror end supporting members 68, 69. The mirror end supporting members 68, 69 is die-cast in aluminum and is rigid enough to hold the reflecting mirror 67. The tips of first protrusions 70, 71 formed on the respective mirror end supporting members 68, 69 abut against the reflecting surface of the reflecting mirror 67.

A laser optical plane 72 shown in the drawing is a first plane formed by the path of the laser light L deflected in the shape of a plane by the rotary polygon mirror 64. Hence, the contact points of the first protrusions 70, 71 of the second mirror supporting parts and the reflecting mirror 67 are nearly on the laser light plane 72. It is difficult to position the first protrusions 70, 71 always on the laser light plane 72 in terms of assembly work. For this reason, if the distance between the first protrusions 70, 71 and the laser optical plane 72 is within a range of a tolerance of ±1 mm, there is not presented any practical problem. Moreover, first protrusions 70, 71 function as abutting parts that abut against a position shaped like a straight line where the deflected laser light L is reflected on the reflecting surface of the reflecting mirror 67 (position extending in the shape of a straight line in the direction of main scanning) and support the reflecting mirror 67 in such a way that the reflecting mirror can swing around the position as a rotational axis. Second protrusions 73, 74 formed on the respective mirror end supporting members 68, 69 abut against both end surfaces of the reflecting mirror 67.

The reflecting mirror 67 has a force applied thereto and is held by the first and second protrusions by plate springs 75, 76 as force applying means fixed to the mirror end supporting members 68, 69 by parts (not shown). A lever 77 made of aluminum is bonded to the one end of the reflecting mirror 67.

According to this construction, by positioning the force applying means of the reflecting mirror 67 on the first and second mirror end supporting members 68, 69, even when a mechanical element having a short effective stroke length such as a plate spring is used as force applying means, the force applying means can move integrally with the mirror end supporting member. For this reason, the reflecting mirror 67 can be kept at a stable position without consuming the stroke of the plate spring 75 and changing a force applied to the reflecting mirror 67.

An adjustment screw 79 is passed through a hole formed in the tip of the lever 77 and is screwed into the tap hole 78 formed in the first mirror end supporting member 68. The adjustment screw 79 is screwed only to a midpoint. By further screwing the adjustment screw 79, the reflecting mirror 67 is rotated clockwise around an abutting point where the first protrusion 70 abuts against the reflecting mirror 67. By loosening the adjustment screw 79, the reflecting mirror 67 is rotated counterclockwise.

Method for Moving and Fixing Mirror end Supporting Member

A base surface 95 formed on the scanner case 80 is a second plane parallel to the laser optical plane 72. The mirror end supporting members 68, 69 are placed on the base plane 95 of a place plane of the scanner case 80 and are pressed onto the base plane 95 at low pressure by pressing means (not shown). Bosses 84 provided on the base plane 95 are fitted in circular elongated holes formed in the mirror end supporting members 68, 69 to bring the mirror end supporting members 68, 69 into a state where the mirror end supporting members 68, 69 can move on the base plane 95 only in a b direction. In this manner, the reflecting mirror 67 can move in a direction parallel to the laser light with which the reflecting mirror 67 is irradiated.

In other words, according to the above-mentioned construction, by providing bosses 84 as fitting means for regulating the moving directions of the first and second mirror end supporting members 68, 69 in one direction on the base plane 95, at the time of adjusting the inclination of main scanning and the magnification of main scanning, the mirror end supporting members 68, 69 can be stably moved and positioned.

Moreover, cams 82, 83 rotatably provided on the scanner case 80 abut against the mirror end supporting members 68, 69. The respective mirror end supporting members 68, 69 are pressed onto the cams 82, 83 by force applying members (not shown). Each of the cams 82, 83 is set in such a way that a radius from a rotational center to an outer periphery changes according to a rotational angle. By rotating the cams 82, 83, the mirror end supporting members 68, 69 are pressed onto the outer peripheral surfaces of the cams 82, 83 to be able to move on the surface of the base plane 95 in the b direction.

Furthermore, the respective mirror end supporting members 68, 69 are fixed to the base plane 95 by screws 81. As described above, because the base plane 95 is a plane parallel to the laser optical plane 72, even when the mirror end supporting members 68, 69 move in the b direction by the rotation of the cams 82, 83, the points where the first protrusions 70, 71 abut against the reflecting mirror 67 always agree with the laser optical plane 72. Further, because the first protrusions 70, 71 move integrally with the mirror end supporting members 68, 69 via the base in the b direction, even when the first protrusions 70, 71 move in the b direction, the points where the first protrusions 70, 71 abut against the reflecting mirror 67 always agree with the laser optical plane 72. That is, the position of scanning line of the laser light on the reflecting mirror 67 is not changed even when the base moves.

In short, according to the above-mentioned construction, the rotational center of the reflecting mirror 67 is always positioned on the laser optical plane 72 regardless of the positions of the mirror end supporting members 68, 69.

Here, the reason why the abutting points (=rotational center) are positioned on the scanning plane of the laser light will be described. FIG. 12 is a diagram showing a change in an optical path length when the scanning plane of the laser light L deviates from the rotational center of the reflecting mirror 67. In a construction in which the rotational center 93 of a mirror 92 does not agree with an incident optical axis 94, when the mirror 92 is swung so as to adjust an irradiation position, a reflecting plane is moved and hence an optical path length is changed by δL and magnification is changed. For this reason, magnification needs to be again adjusted. Meanwhile, in FIG. 13 in which the scanning plane of the laser light agrees with the rotational center of the mirror 92, even when the mirror 92 is swung so as to adjust an irradiation position, a reflecting position is not moved and hence the above-mentioned change δL is not caused. From this, it is found that the construction of causing the scanning plane of the laser light to agree with the rotational center of the mirror 92 is necessary for completing the adjustment of irradiation position and the adjustment of magnification by one operation.

For this reason, in the optical scanning apparatus according to the present embodiment, there can be realized a construction in which even when the reflecting mirror 67 is rotated to adjust an irradiation position in the direction of sub-scanning on the photosensitive surface of the photosensitive drum 11 in order to change an angle at which the reflecting mirror 67 is mounted on the laser optical plane 72, an optical path length is not changed.

In other words, according to the above-mentioned construction, the adjustment of the irradiation position of sub-scanning can be made by rotating the reflecting mirror 67 around the scanning plane of the laser light L incident on the reflecting mirror 67 and hence the magnification of main scanning is not deviated. Moreover, it is not necessary to re-adjust the magnification of main scanning after the adjustment of the irradiation position of sub-scanning. Hence, the above-mentioned construction produces the effect of reducing the number of man-hours required to make the adjustment.

Adjustment Items and Adjustment Jig of Reflecting Mirror

In the present embodiment, the following three adjustment items can be made by moving the reflecting mirror 67 in three directions.

(1) To adjust the inclination between the generating line of the photosensitive drum and the scanning line of laser light (adjustment of the inclination of main scanning)

(2) TO ADJUST THE LENGTH OF LASER LIGHT FOCUSING ON THE PHOTOSENSITIVE DRUM (ADJUSTMENT OF THE MAGNIFICATION OF MAIN SCANNING)

(3) To adjust an irradiation position in the direction of sub-scanning of the photosensitive drum surface (adjustment of the irradiation position of sub-scanning)

The above-mentioned adjustments are made by the use of an already existing measurement jig (not shown). The measurement jig detects the position and timing of irradiated laser light L by a plurality of CCDs mounted at positions corresponding to the exposed positions of the photosensitive drum and measures the above-mentioned three items.

Adjustment Procedure of Reflecting Mirror

Figure 4:
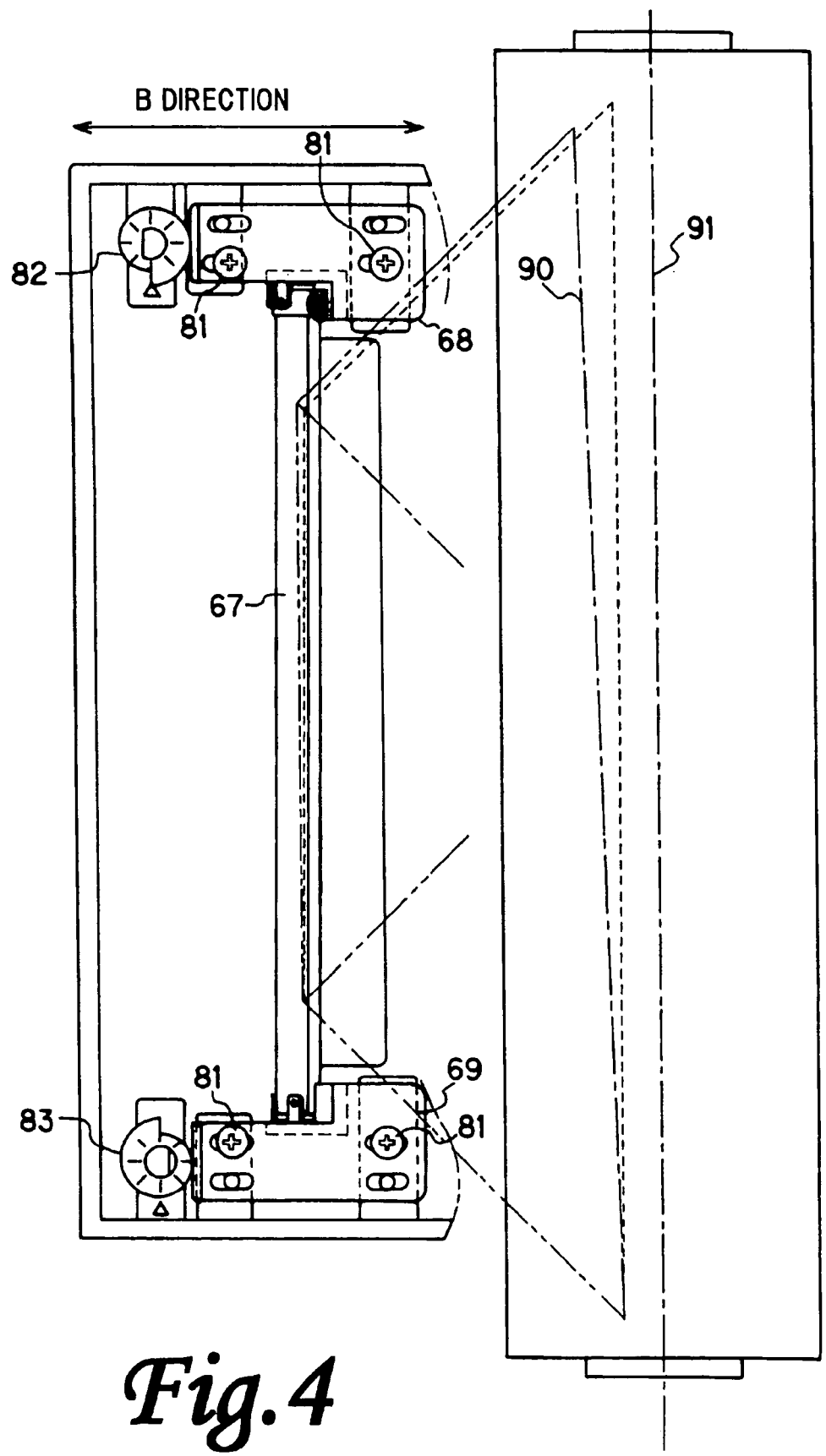
FIG. 4 is a diagram showing the adjustment of the inclination of main scanning according to an embodiment of the present invention.
Figure 11:
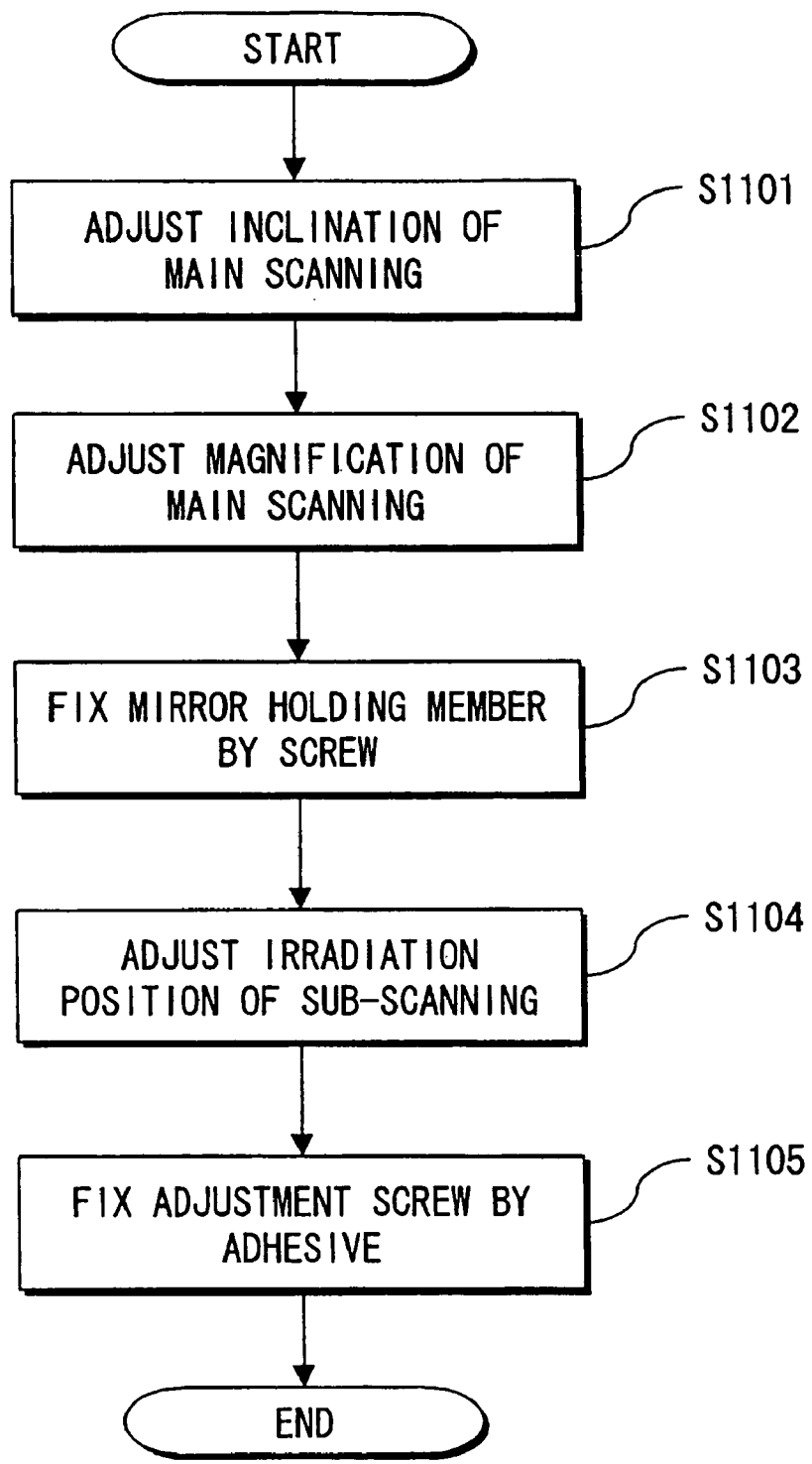
FIG. 11 is a flow chart for adjusting a mirror according to the embodiment of the present invention.

First, the inclination of main scanning is adjusted (S1101). FIG. 4 is an image diagram showing the adjustment of the inclination of main scanning. Magnification is enlarged in the direction of adjustment for the sake of clarity (ditto for FIG. 5 and FIG. 6). FIG. 11 is a flow chart showing the procedure of adjusting the mirror.

The screws 81 for fixing the mirror end supporting members 68, 69 are loosened before adjustment and hence the mirror end supporting members 68, 69 can be moved in the b direction. The main scanning line 90 at an exposure position read by an adjustment jig is shown by a single dot and dash line and when the main scanning line 90 is at an inclination with respect to the generating line 91 of the photosensitive drum, the cam 82 is rotated while checking the inclination to press in the mirror end supporting member 68 to finish the adjustment at the time when the generating line 91 and the main scanning line 90 are parallel to each other (state shown by a broken line).

Figure 5:
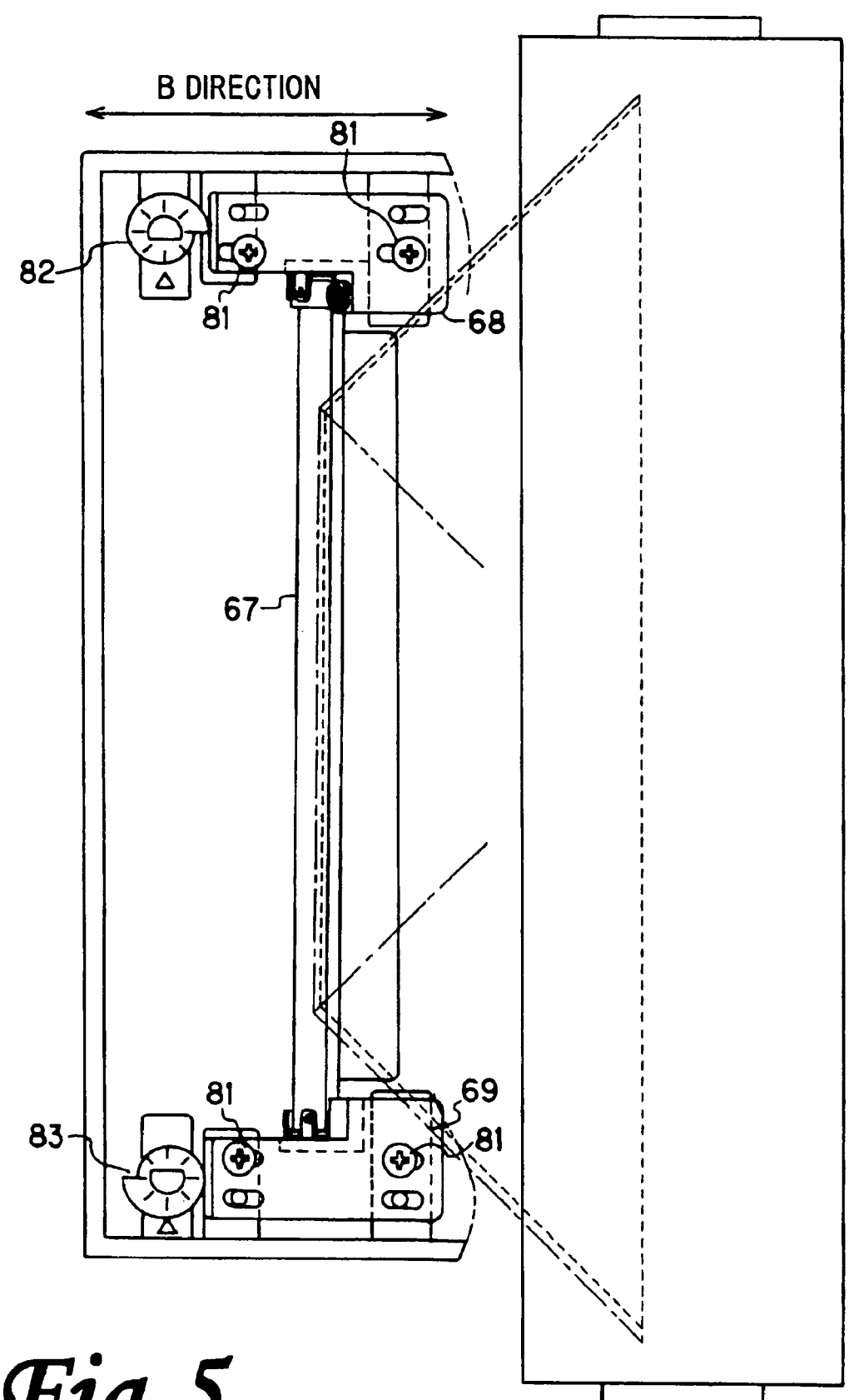
FIG. 5 is a diagram showing the adjustment of the magnification of main scanning according to the embodiment of the present invention.

Next, the magnification of main scanning is adjusted (S1102). FIG. 5 is an image diagram showing the adjustment of the magnification of main scanning. The magnification of main scanning is determined by measuring the time required for laser light to pass two CCD arranged in the direction of main scanning. The state before adjustment is shown by a single dot and dash line and the magnification is larger than a specification. Then, by rotating the cams 82, 83 by an equal angle while checking measurement values, two mirror end supporting members 68, 69 are moved by an equal distance in the b direction to adjust magnification to correct magnification (state shown by a broken line).

At this adjustment of the magnification of main scanning, the two mirror end supporting members 68, 69 are moved by an equal distance by rotating the cams 82, 83 by an equal angle, whereby the reflecting mirror 67 is also moved in parallel. Then, the inclination of main scanning is not changed and hence adjustment work does not need to be repeated. The screws 81 are screwed in after the above-mentioned adjustment is finished to fix the respective mirror end supporting members 68, 69 to the scanner case 80 (S1103), whereby the adjustment work is finished. The cams 82, 83 are not required thereafter and hence can be removed.

Figure 6:
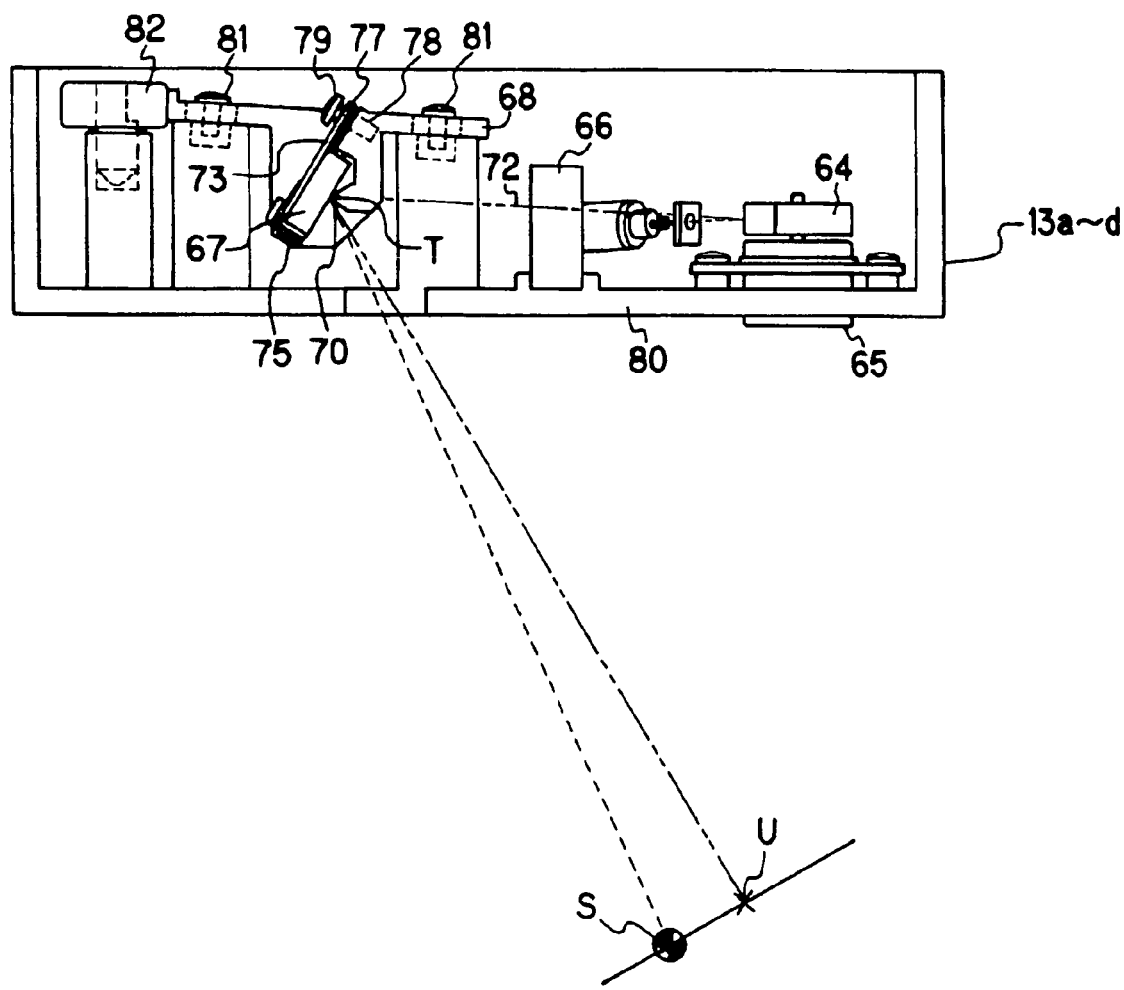
FIG. 6 is a diagram showing the adjustment of the irradiation position of sub-scanning according to the embodiment of the present invention.
Figure 7:
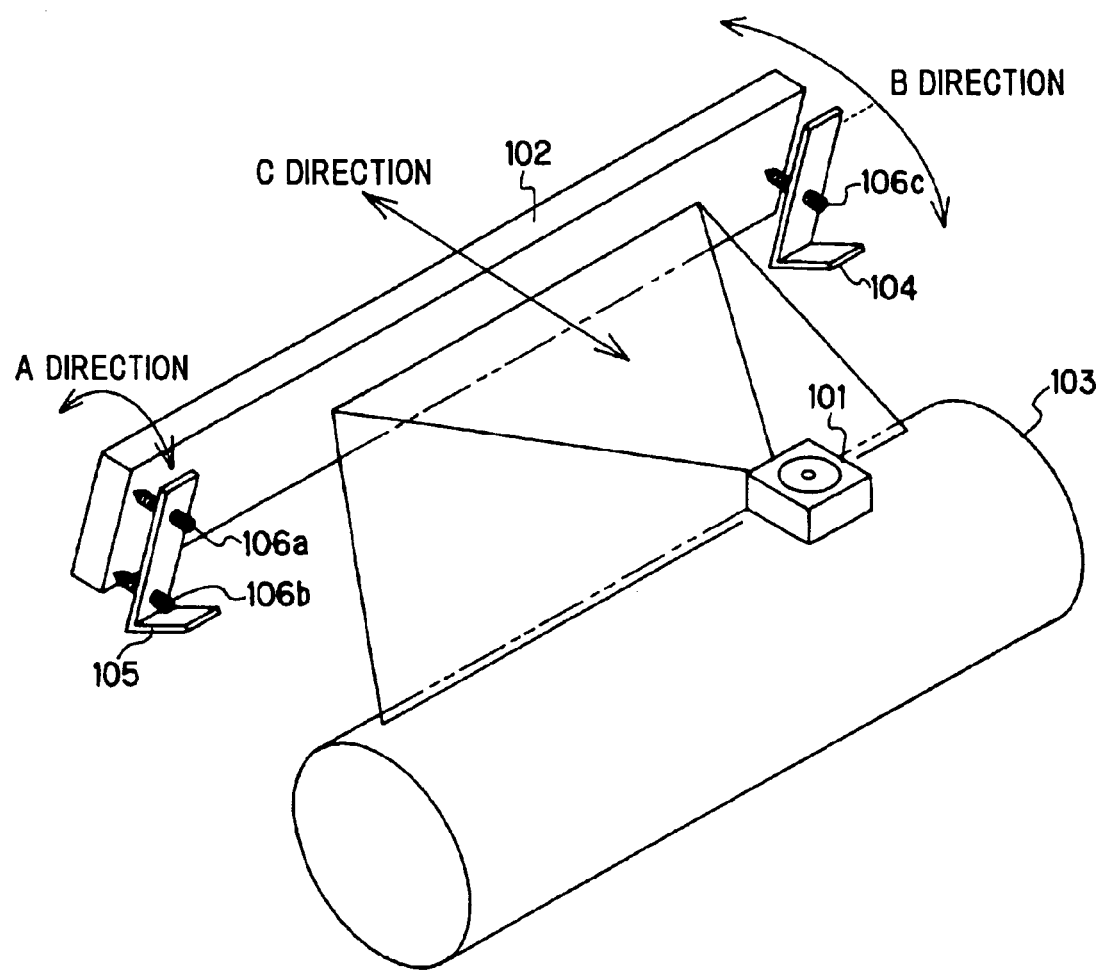
FIG. 7 is a perspective view showing a construction for supporting a conventional reflecting mirror and a method for adjusting the same.
Figure 8:
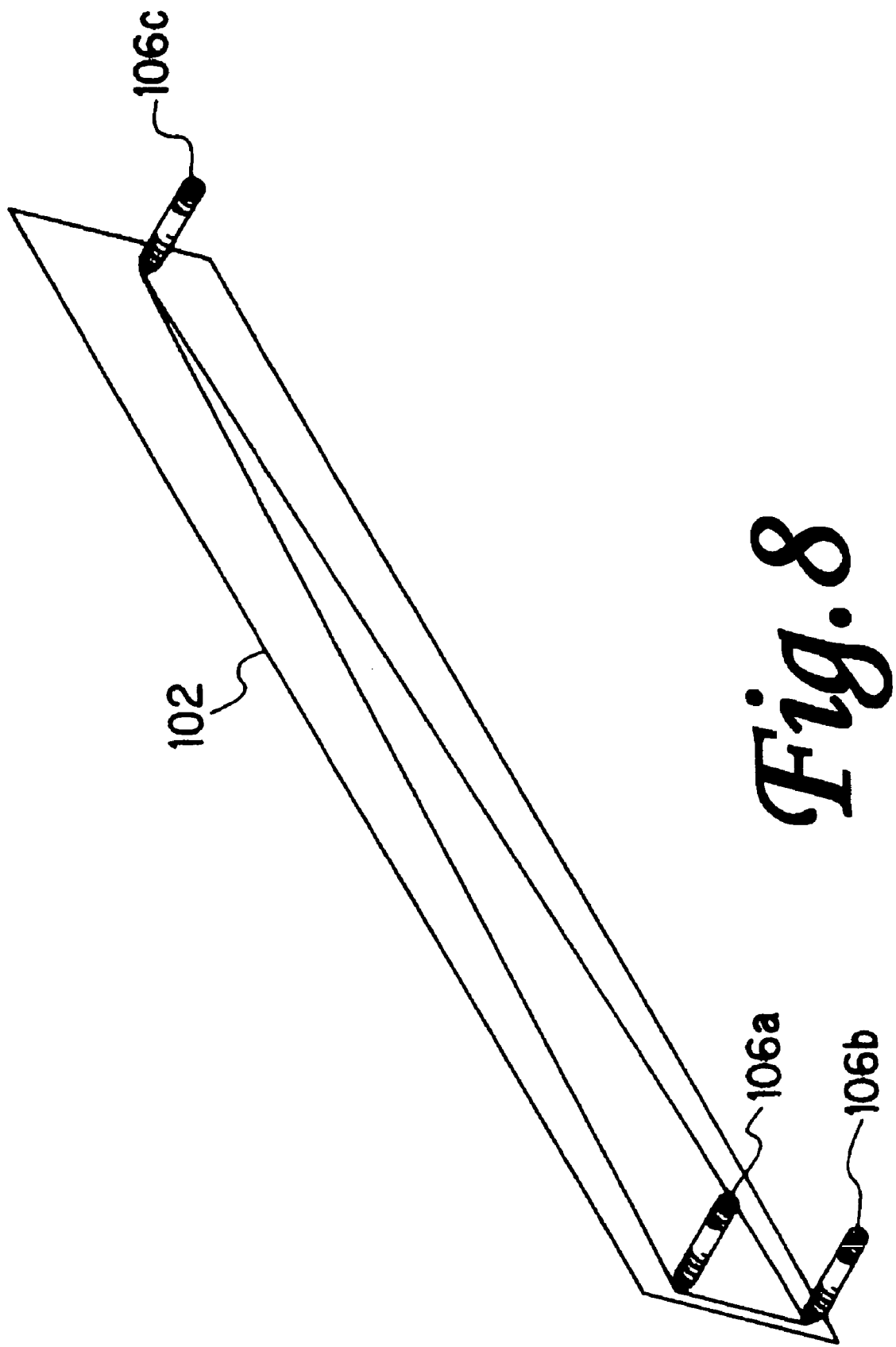
FIG. 8 is a diagram showing a method for adjusting a conventional reflecting mirror.
Figure 9:
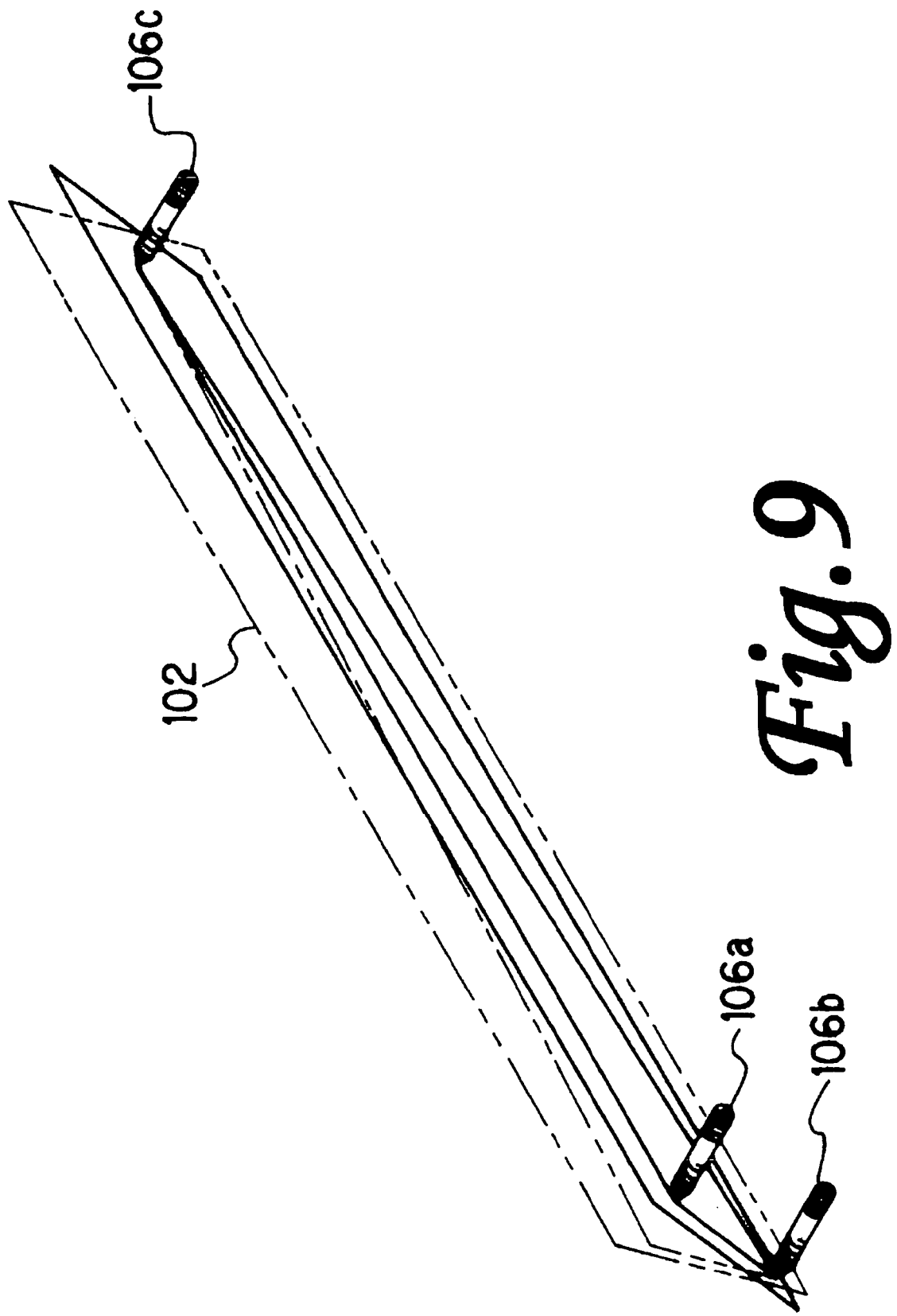
FIG. 9 is a diagram showing a method for adjusting a conventional reflecting mirror.

Finally, the irradiation position of sub-scanning is adjusted (S1104). FIG. 6 is an image diagram showing the adjustment of the irradiation position of sub-scanning. The irradiation position of the laser light L (double dot and dash line) before adjustment is at a position U and deviates with respect to a specification position S. Then, the lever 77 mounted on the reflecting mirror 67 is pressed in by screwing in the adjustment screw 79 to rotate the reflecting mirror 67 around an abutting point T where the first protrusion 70 abuts against the reflecting mirror 67 to thereby bend the optical path toward the specification position S as shown by a broken line. According to this construction, it is possible to lessen the sensitivity of adjustment and hence to make a high accuracy adjustment by enlarging the leverage of adjustment by the lever 77.

Because the rotational center of the reflecting mirror 67 agrees with the laser optical plane 72 at the time of adjusting the irradiation position of sub-scanning, the magnification is never changed and hence the adjustment work does need to be repeated here. After the adjusting of the irradiation position of sub-scanning is finished, the threaded portion of the adjustment screw 79 is fixed to the tap hole of the mirror end supporting members 68, 69 by an adhesive (S1105), whereby the adjustment work is finished.

According to the present invention, as described above, other adjustment items do not go out of adjustment by the respective adjustment works and hence adjustment work does not need to be repeated, which in turn can reduce the number of man-hours required for adjustment.

In this regard, in the present embodiment have been described three adjustment items of the mirror, but it is not intended to limit the present invention to the items described here. For example, it is also recommended that the magnification of main scanning is electrically adjusted by modulating the clock of emitting the laser light and hence is used for adjusting focus instead.

Moreover, the present embodiment employs a construction in which the lever 77 mounted on the reflecting mirror 67 is pressed in by the adjustment screw 79. However, the lever 77 is not a necessary construction requirement but a construction can be employed in which the reflecting mirror 67 is directly pressed in by the adjustment screw 79. According to this construction, because the lever is not used, the components can be reduced in number.

According to the present invention, even when the reflecting mirror 67 is moved so as to make an adjustment on the direction of main scanning, the rotational axis of the reflecting mirror 67 agrees with the laser scanning line in the longitudinal direction of the reflecting mirror 67. Hence, there is no reversion in the adjustment work and the number of man-hours required for the adjustment work can be reduced.

While the embodiment of the present invention has been described up to this point, it is not intended to limit the present invention to the above-mentioned embodiment but it should be understood that all alternatives and modifications may be made within the spirit and scope of the present invention.

This application claims priority from Japanese Patent Application No. 2004-360269 filed Dec. 13, 2004, which is hereby incorporated by reference, herein.

What is claimed is:

1. An optical apparatus for irradiating a surface to be scanned with laser light, comprising:
   rotary deflecting means for deflecting laser light emitted by a laser emitting means in a shape of a plane;
   a mirror for reflecting the laser light:
   an enclosure for housing the mirror;
   a first mirror supporting part capable of moving in a direction parallel to the laser light irradiated toward the mirror and supporting the mirror;

a second mirror supporting part capable of supporting the mirror in such a way that the mirror can rotate around an abutting part which abuts against both end portions of a reflecting surface of the mirror on a line at which the laser light is in close agreement with a scanning line with which the mirror is scanned;

force applying means for applying a force to the mirror at the abutting part; and swinging means for swinging the mirror around the abutting part, wherein the swinging means is provided on the first mirror supporting part.

2. An optical apparatus according to claim 1, wherein the second mirror supporting part moves in a direction parallel to the laser light irradiated from the rotary deflecting means when the first mirror supporting part moves.

3. An optical apparatus according to claim 1, wherein the first mirror supporting part can move on a second plane parallel to a first plane including a path of the deflected laser light.

4. An optical apparatus according to claim 1, wherein the first mirror supporting part includes a first mirror end supporting member and a second mirror end supporting member that support both ends of the mirror, respectively.

5. An optical apparatus according to claim 1, wherein the force applying means is provided on the first mirror supporting part.

6. An optical apparatus according to claim 1, comprising: fitting means for regulating a direction of movement of the first mirror supporting part in one direction.

7. An optical apparatus according to claim 1, comprising: an image bearing member scanned by an optical scanning unit and having an electrostatic image formed thereon; and developing means for developing the electrostatic latent image formed on the image bearing member, and used for an image forming apparatus.

8. An optical apparatus according to claim 1,
wherein when the first mirror supporting part moves in parallel, the second mirror supporting part moves integrally with and in parallel to the first mirror supporting part.

* * * * *

UNITED STATES PATENT AND TRADEMARK OFFICE
CERTIFICATE OF CORRECTION

PATENT NO. : 7,379,222 B2 Page 1 of 1
APPLICATION NO. : 11/272724
DATED : May 27, 2008
INVENTOR(S) : Kenji Ushio It is certified that error appears in the above-identified patent and that said Letters Patent is hereby corrected as shown below:

COLUMN 1:
Line 25, "of" should be deleted; and
Line 66, "screw" should read -- screws --.

COLUMN 3:
Line 67, "20; a" should read -- 20; an --.

COLUMN 4:
Line 8, "A photosensitive" should read -- Photosensitive --;
Line 31, "to a" should read -- to an --; and
Line 31, "as a" should read -- as an --.

COLUMN 10:
Line 63, "light:" should read -- light; --; and
Line 64, "minor;" should read -- mirror; --.

Signed and Sealed this

Fourth Day of November, 2008

JON W. DUDAS
*Director of the United States Patent and Trademark Office*